(12) United States Patent
Grossman

(10) Patent No.: US 7,154,415 B2
(45) Date of Patent: Dec. 26, 2006

(54) CELESTIAL BODY COMMUNICATION TECHNIQUES

(76) Inventor: Richard Grossman, 2000 De Mille Dr., Los Angeles, CA (US) 90027

( * ) Notice: Subject to any disclaimer, the term of this patent is extended or adjusted under 35 U.S.C. 154(b) by 14 days.

(21) Appl. No.: 11/131,722

(22) Filed: May 17, 2005

(65) Prior Publication Data
US 2005/0259815 A1 Nov. 24, 2005

(51) Int. Cl.
*H03M 11/00* (2006.01)
(52) U.S. Cl. .................. 341/22; 434/169; 434/156
(58) Field of Classification Search .................. 341/20, 341/22; 434/156, 169; 400/486, 487, 485
See application file for complete search history.

(56) References Cited
U.S. PATENT DOCUMENTS 5,210,689 A * 5/1993 Baker et al. .................... 704/1
5,297,041 A * 3/1994 Kushler et al. ............. 715/534
6,022,222 A * 2/2000 Guinan ........................ 434/169
6,580,663 B1 * 6/2003 Whitmore .................... 368/15

\* cited by examiner

*Primary Examiner*—Timothy Edwards, Jr.
(74) *Attorney, Agent, or Firm*—Paul J. Backofen, Esq.; Crockett & Crockett

(57) ABSTRACT

In a communication technique using the apparent distribution of stars and other celestial bodies visible from the earth to generate codes corresponding to communication characters such as the English alphabet and or Arabic numbers, the characters of a conventional keyboard, or any other suitable character set. The stars, or subset of stars, or combinations of stars and other celestial bodies to be used may be divided into sections; the stars or stars and celestial bodies of each section may be assigned to represent one or more characters of the character set to be used. A communication to be sent is prepared by replacing each conventional character of the communication with the section of stars that correspond to the character. The resulting communication is unrecognizable as a conventional communication, it has a high degree of security, and yet it has an esthetic or romantic appeal similar to that of the night sky. Any celestial communication may be decoded by reversing the procedure.

2 Claims, 3 Drawing Sheets

CELESTIAL BODY COMMUNICATION TECHNIQUES

FIELD OF THE INVENTIONS

This disclosure relates to communication systems, and more specifically to bi-directional coded communication using codes formed by relative positions of celestial bodies.

BACKGROUND OF THE INVENTIONS

Conventional communications may be coded using existing symbols such as letters and numbers. Coded communications using existing symbols may have limited esthetic or artistic appeal.

What is needed is a method and apparatus for creating, encoding, and decoding communications that have a high security and esthetic and or artistic appeal.

SUMMARY

In a first aspect, the present disclosure provides a communication technique using the apparent distribution of stars and other celestial bodies visible from the earth to generate codes corresponding to communication characters such as the English alphabet and or Arabic numbers, the characters of a conventional keyboard, or any other suitable character set. The stars, or subset of stars, or combinations of stars and other celestial bodies to be used may be divided into sections; the stars or stars and celestial bodies of each section may be assigned to represent one or more characters of the character set to be used. A communication to be sent is prepared by replacing each conventional character of the communication with the section of stars that correspond to the character. The resulting communication is unrecognizable as a conventional communication, it has a high degree of security, and yet it has an esthetic or romantic appeal similar to that of the night sky. Any celestial communication may be decoded by reversing the procedure.

The stars and other celestial bodies are not static as seen from the earth or other point in the universe, they move relative to each other. The distribution of stars and other celestial bodies will seem to be different from different observation points on the earth's surface or in the universe. In another aspect, the present disclosure includes selecting an epoch and or observation point to identify a star distribution for a communication. The choice of epoch and or observation point may be based on the personal data of the sender or the intended recipient or other factors. For example, a man desiring to send a note to his wife may select a celestial epoch corresponding to the birth date of the intended recipient. The epoch information may be included in the message, or it may be sent separately. The epoch and observation point will be necessary to successfully decode the message.

In still another aspect of the present disclosure stars or other celestial bodies may be selected for code use based on their apparent brightness, or other characteristic of the stars or other celestial bodies. For example, stars having an apparent brightness of −1 to +1 may be used to code messages. In another example, combinations of apparently red stars and galaxies and stars with apparent magnitudes less than +5 may be used as a code set.

In still another aspect of the present disclosure, representations of stars and or other celestial bodies to be used for message coding may be on a type face ball or other suitable typeface transfer device for use in a conventional typewriter. The celestial type ball may operate to produce celestial coded communications directly on paper or other suitable media according to the present disclosure.

In another still further aspect, the present disclosure includes a method of encoding and decoding esthetically pleasing communication through a network, independent of conventional coding. The use of celestial body sets to encode communications will generate a message that may offer very few clues visible to an observer of the celestial body set, epoch and or observation point of the celestial code used to encode the message.

These and other features and advantages of this disclosure will become further apparent from the detailed description and accompanying figures that follow. In the figures and description, numerals indicate the various features, like numerals referring to like features throughout both the drawings and the description.

DETAILED DESCRIPTION OF THE PREFERRED EMBODIMENT(S)

Figure 1:
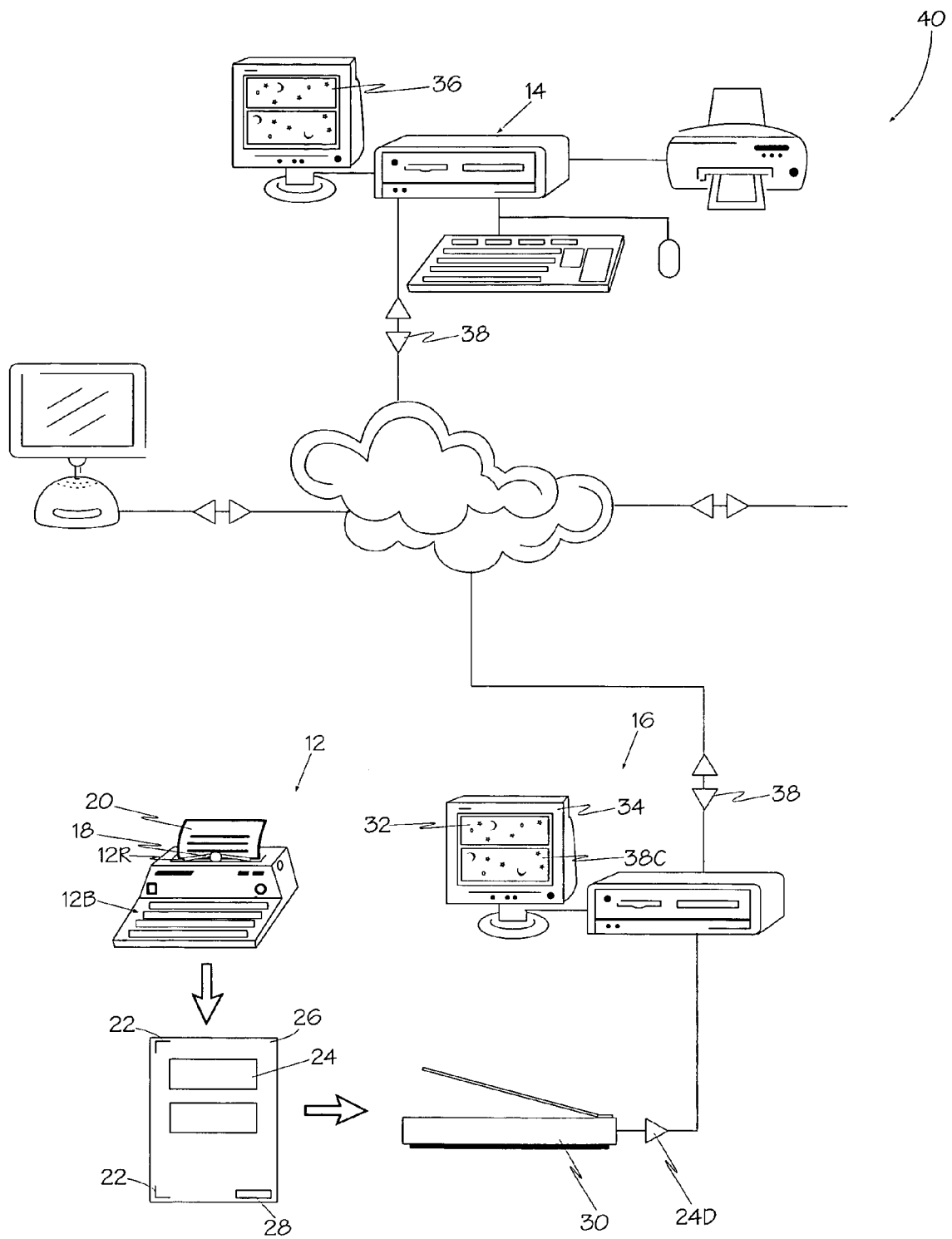
FIG. 1 is a block diagram of a general network with several alternate communication paths according to the present disclosure.

Referring now to FIG. 1, encoded communication according to the present disclosure may be prepared on a typewriter such as typewriter 12, or a computer such as computer 14 or computer 16. Any suitable computing device may be used to encode or decode communication according to the present disclosure.

If, for example, typewriter 12 is used to prepare an encoded communication according to the present disclosure, a user may type the desired message using keyboard 12B. In response to keys of keyboard 12B being struck, celestial type ball 18 moves to strike paper 20 directly or through any suitable ink transfer element such as ribbon 12R. The action of celestial type ball 18, coordinated with an ink transfer element such as ribbon 12R and communication media such as paper 20, in response to keystrokes on keyboard 12B may produce a coded communication such as coded communication 24 on paper 26.

A coded communication such as encoded communication 24 may include elements to assist in decoding the message such as but not limited to registration marks or other alignment elements such as registration marks 22, and encoding information 28. Encoding information 28 may include celestial epoch, observation point and celestial body set information such as apparent magnitude, celestial bodies included or excluded and other information to identify the celestial body set used to encode the message.

An encoded message such as coded communication 24 may be scanned or otherwise digitized using any suitable device such as scanner 30. Digitized communication 24D may be sent to any suitable computing device such as computer 16 to be decoded. To be decoded, digitized communication 24D includes encoding information such as encoding information 28. computer 16 uses encoding information 28 to decode digitized communication 24D and form a decoded communication such as decoded communication 32 which may be presented for viewing on display 34 or any other suitable device.

In another embodiment of the present disclosure, an encoded communication such as encoded communication 36 may be created or otherwise generated using a computing device such as computer 14. Encoding information may be resident in digital data stream 38 transferring encoded communication 36 through network 40. Alternatively, encoding information may be transferred separately between users, or it may be previously agreed upon and may be entered or otherwise designated by a user to enable coding and decoding of any communication. Digital data stream 38 may be conducted through network 40 and a selected recipient of digital data stream 38 such as computer 16 may decode digital data stream 38 to recover communication 38C.

Figures 2, 3:
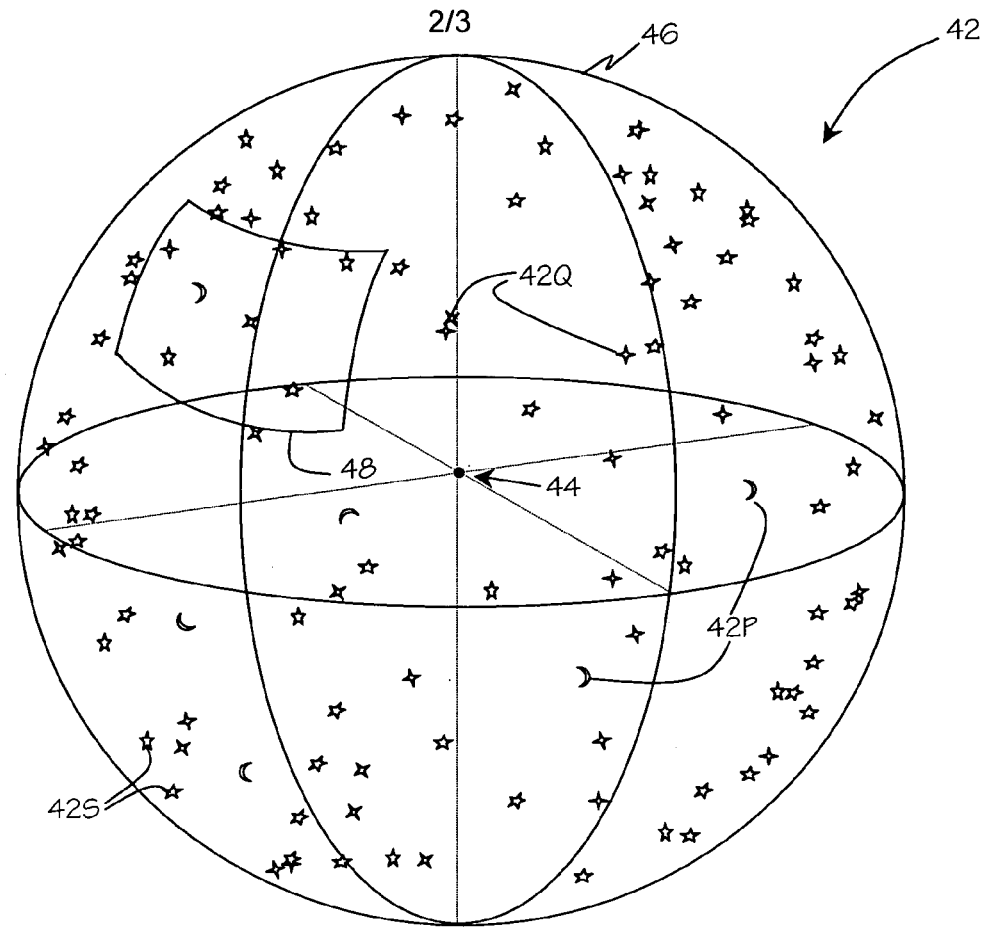
FIG. 2 is a spherical celestial body chart for use according to the present disclosure.
FIG. 3 is a two-dimensional chart of an area of the celestial body chart of FIG. 1.

Referring now to FIG. 2, a distribution of celestial bodies may include an assortment of suitable celestial objects 42 such as stars 42S and any other suitable celestial objects such as objects 42Q and 42P. Celestial objects 42 may appear to be located on a celestial sphere such as sphere 46 when viewed from position 44. Position 44 may be on the surface of the earth, the moon or any suitable point in space. Celestial sphere 46 may be used to create a 2-dimensional representation of the apparent relative positions of celestial objects 42.

A portion of sphere 46 may be selected for use encoding messages. For example, area 48 of sphere 46 may be selected to encode messages. Area 48 may be transformed to two-dimension section 48T using any suitable transform function. Two-dimension section 48T may be further subdivided into sections such as section 48S. Sections such as section 48S may be used to represent one or more characters of an original communication. Sections such as section 48S may each be characterized as a celestial character. Section 54, celestial character Q' may represent the letter Q, and section 56, celestial character A' may represent the letter A and section 58, celestial character Z' may represent the letter Z. Other characters of a conventional keyboard may be similarly represented by celestial characters from sections of two-dimension section 48T. Encoding information may include parameters of area 48 such as size and orientation. Using areas of sphere 46 may enable many suitable areas such as area 48 to be selected from a suitable set of celestial objects such as celestial objects 42.

Figure 4:
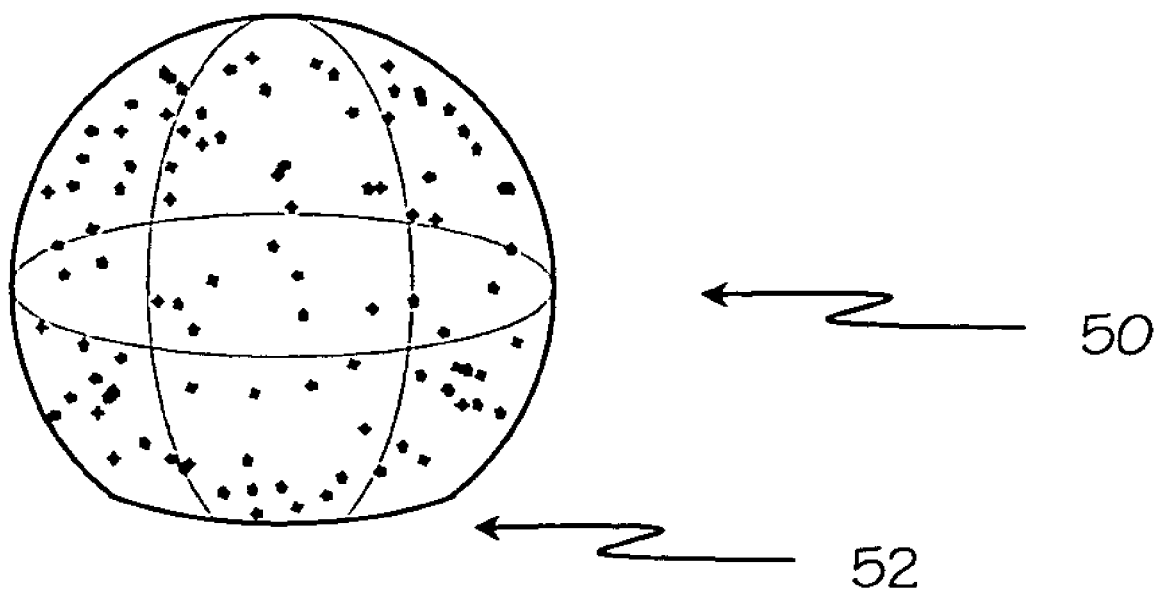
FIG. 4 is a perspective view of a celestial body type ball according to the present disclosure.

In another embodiment of the present disclosure representations of celestial objects 42 may be located on a generally spherical type ball 50 as shown in FIG. 4. A portion 52 of type ball 50 may be truncated or otherwise opened to enable mechanical connection to a typewriter such as typewriter 12. The celestial characters may be included on a type ball, a daisy wheel or any other suitable medium.

Having now described the method and apparatus of this disclosure in accordance with the requirements of the patent statutes, those skilled in this art will understand how to make changes and modifications in the present disclosure to meet their specific requirements or conditions. Such changes and modifications may be made without departing from the scope and spirit of the disclosure as set forth in the following claims.

I claim:

1. A method for encoding communications including a plurality of characters comprising:
   selecting an area of celestial objects from a 2-dimensional representation;
   subdividing the selected area of celestial bodies to form a plurality of sections, each section corresponding to one of the plurality of communication characters; and
   replacing each of the plurality of characters of a communication with a corresponding section.

2. A method of celestial encoding of a communication comprising:
   creating a communication using one or more conventional characters;
   forming a correspondence between each, conventional character and a celestial character; and
   replacing each conventional character with the corresponding celestial character.

* * * * *